United States Patent [19]

Peters

[11] 4,194,347
[45] Mar. 25, 1980

[54] METHOD AND APPARATUS FOR SHAKING TREES GROWN IN ROWS

[75] Inventor: Ronald L. Peters, Modesto, Calif.

[73] Assignee: FMC Corporation, San Jose, Calif.

[21] Appl. No.: 885,147

[22] Filed: Mar. 10, 1978

[51] Int. Cl.² .............................................. A01D 46/00
[52] U.S. Cl. ..................................... 56/328 TS; 56/329
[58] Field of Search ............................ 56/328 TS, 329

[56] References Cited

U.S. PATENT DOCUMENTS

| | | | |
|---|---|---|---|
| 3,163,458 | 12/1964 | Brandt, Jr. ........................ | 56/328 TS |
| 3,457,712 | 7/1969 | Gould et al. ..................... | 56/328 TS |
| 3,460,329 | 8/1969 | Overstreet, Jr. ................ | 56/328 TS |
| 3,477,215 | 11/1969 | Herbst .............................. | 56/328 TS |
| 3,564,825 | 2/1971 | Gould et al. ..................... | 56/328 TS |
| 3,596,455 | 8/1971 | Adrian ............................. | 56/328 TS |
| 3,623,308 | 11/1971 | Nye .................................. | 56/328 TS |
| 3,683,617 | 8/1972 | Vallicella ........................ | 56/329 |
| 3,706,187 | 12/1972 | Toet ................................. | 56/329 |
| 3,762,139 | 10/1973 | Tompkins ........................ | 56/328 TS |
| 3,780,510 | 12/1973 | Tompkins ........................ | 56/328 TS |
| 3,785,131 | 1/1974 | Friday et al. .................... | 56/328 TS |
| 3,964,244 | 6/1976 | Vallicella ........................ | 56/328 TS |

Primary Examiner—Louis G. Mancene
Assistant Examiner—Paul J. Hirsch
Attorney, Agent, or Firm—R. S. Kelly; T. J. McNaughton; J. F. Verhoeven

[57] ABSTRACT

In a down-the-row type of tree shaking apparatus, a support frame is pivotally mounted to a carrier vehicle for rotation about an axis which is parallel to the longitudinal axis of the vehicle, and a suspension frame, from which a tree shaking and clamping assembly depends, is pivotally mounted to the support frame for rotation about an axis which is transverse to the longitudinal axis of the vehicle. The shaking and clamping assembly includes a housing and a pair of clamping arms which are pivotally mounted to the housing for rotation about parallel axes which are perpendicular to the transverse axis of rotation of the suspension frame. Each clamping arm is retractable from the position it assumes during shaking through an arc of approximately 90°, and each arm is operated by a separately controllable hydraulic cylinder. After shaking a tree in a particular row, both arms are retracted to positions which are generally parallel to the longitudinal axis of the vehicle to enable the vehicle to move directly forward; and before arriving at the next tree in the row, the rear arm only is extended outwardly to its tree-engaging position. The extended rear arm is then used by the vehicle operator as a visual reference for maneuvering the vehicle to a position whereat the extended arm abuts or is closely adjacent to the next tree in the row to be shaken. When the rear arm is in such position, the front arm is extended to tightly engage the tree and bring both of the clamping arms into tight clamping engagement with the tree. The tree is then shaken.

7 Claims, 9 Drawing Figures

FIG_1

FIG_2

FIG_6

FIG_3

FIG_4

FIG_5

METHOD AND APPARATUS FOR SHAKING TREES GROWN IN ROWS

BACKGROUND OF THE INVENTION

1. Field of the Invention

This invention generally relates to a mobile apparatus for shaking trees or bushes to remove fruits or nuts therefrom and more particularly concerns an improved tree shaking apparatus of the type which is moved along a generally straight path from a shaking position beside one tree in a row of trees to a shaking position beside the next tree in the same row of trees.

2. Brief Description of the Prior Art

In the past various types of mobile tree shaking devices have been used in the harvesting of fruits and nuts. Basically, the devices are either of the "in-and-out" type or the "down-the-row" type. An example of the former type is disclosed in U.S. Pat. No. 3,457,712 to R. D. Gould et al. The disclosed device includes a carrier vehicle having an articulated boom assembly extending longitudinally from the front of the operator's cab, a suspension unit mounted to a boom, and a tree shaking and clamping assembly resiliently suspended from the suspension unit. In the operation of this type of mobile tree shaker, the carrier vehicle is first moved inwardly toward the tree to be shaken until the vehicle is close enough to the tree so that the trunk thereof may be grasped by the clamping arms of the shaking and clamping assembly. After the tree has been shaken and the clamping arms disengaged from the tree, the vehicle is moved outwardly along the same path taken when moved into the shaking position adjacent the tree, and thereafter the vehicle is turned and driven down the row of trees to the next tree in the row. Obviously, it is from this manner of travel relative to the tree to be shaken that the shaker is known as an "in-and-out" type of tree shaker.

It will be appreciated that when the rows of trees to be harvested are tightly spaced, it is difficult to manuever the "in-and-out" type of tree shaker. Another major problem is the risk of injury to field workers during the course of harvesting a row of trees when the vehicle is withdrawn from a tree.

The aforementioned "down-the-row" type of shakers generally include a tree shaking and clamping assembly which is mounted to a carriage which, in turn, is mounted to a support frame so that the tree shaking and clamping assembly may be moved inwardly and outwardly relative to the carrier vehicle along a path which is transverse to the longitudinal axis of the vehicle. The carrier vehicle is driven along a path which is parallel to the row of trees to be harvested; and after positioning the vehicle in a position transversely aligned with a tree in the row to be shaken, the carriage is activated to outwardly extend the shaking and clamping assembly to a position such that the clamping arms may be actuated to engage the trunk of the tree. This "down-the-row" mode of harvesting will be appreciated to be safer since it is not necessary that the vehicle be backed away from a tree. Also, this mode permits harvesting of orchards having relatively small transverse spacings between the rows of trees in the orchard.

Examples of this latter type of tree shaking apparatus are illustrated and described in U.S. Pat. Nos. 3,683,617 to Vallicella and 3,477,215 to Herbst. It is noted that both of these patents illustrate a combination of a "down-the-row" tree shaking apparatus and also a catch frame and conveyor means mounted to the carrier vehicle for accumulating the detached fruits or nuts and storing the same in a bin carried on the vehicle.

It will be recognized that the aforementioned transversely movable carriage assembly, which supports the shaking and clamping assembly, is a relatively complex structure which is relatively expensive to manufacture and maintain. Moreover, in the operation of such prior art down-the row tree shakers, it is difficult for the operator thereof to determine when the vehicle is in a location which is transversely aligned with the trunk of the tree to be shaken so that the carriage may be extended outwardly to move the shaking assembly to a shaking position adjacent the tree trunk. Thus, oftentimes the operator will stop at a position improperly aligned with a tree to be harvested, and, upon actuating the carriage, the outer ends of the clamping arms, or the nearby parts of associated catch frame assembly, will strike the tree, thereby damaging the tree and also perhaps the clamping arms or the associated catch frame apparatus, and also necessitating a withdrawal of the carriage and a repositioning of the vehicle to correct the misalignment condition.

SUMMARY OF THE INVENTION

The method and apparatus of the present invention overcome the aforementioned shortcomings of prior art tree shaking apparatus and methods by providing a carrier vehicle with a tree shaking and clamping assembly having a housing which extends transversely of the vehicle to a position which is closely adjacent a row of trees to be harvested and which has scissorable clamping arms, with each clamping arm being pivotable along an arcuate path from a shaking position engaging the respective front or rear side of a tree to a stowed position which is generally parallel to the longitudinal axis of the carrier vehicle.

When the carrier vehicle is approaching a tree trunk to be shaken, at least the leading clamping arm is pivoted to its stowed position, and then the vehicle is maneuvered along a generally straight path such that the stowed leading arm will clear the tree trunk to be shaken. The vehicle is then stopped when in a position transversely aligned with the tree. Then the clamping arms are simply outwardly pivoted to abut against the leading and trailing sides of the tree trunk to be shaken without moving the housing of the shaking and clamping assembly in a transverse direction relative to the carrier vehicle.

In the preferred mode of operation, during the approach to a tree to be shaken the rear clamping arm only is extended to thereby serve as a visual reference for assisting the operator in maneuvering the carrier vehicle quickly and reliably to the proper position adjacent a tree where the front clamping arm may be extended to tightly engage the tree between the arms. After shaking a tree, at least the rear arm is retracted to its stowed position so that the vehicle may be moved directly forward to the next tree in the row. Before arriving at the next tree, the rear arm is extended and the front arm is retracted to arrange the arms in the aforedescribed orientations suitable for facilitating the maneuvering of the carrier vehicle to the proper position for shaking the tree.

Preferably, the housing of the tree shaking and clamping assembly is mounted to a suspension frame which, in turn, is mounted to a support frame which is pivotable about an axis extending longitudinally of the carrier vehicle. The support frame is pivoted about such longitudinal axis to adjust the height at which the clamping arms grasp the tree trunk. The suspension frame is also preferably pivotally attached to the support frame for rotation about a transversely extending axis to permit the clamping arms to pivot when applied to a tree trunk which is oblique to the plane of the longitudinal axis of the vehicle.

DESCRIPTION OF A PREFERRED EMBODIMENT

Figure 1:
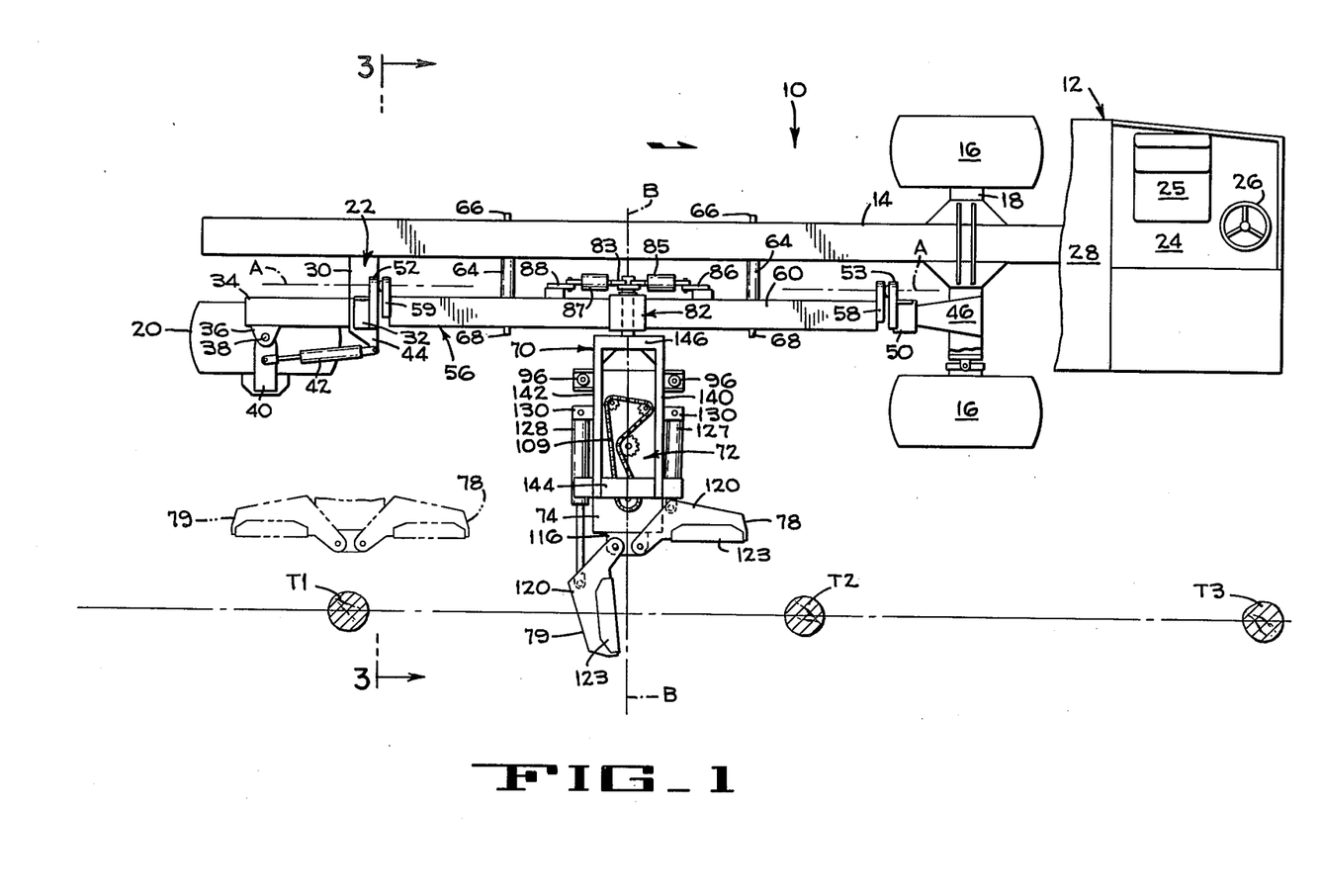
FIG. 1 is a top plan view of a preferred embodiment of the improved mobile tree shaking apparatus of the present invention, with portions thereof being broken away.
Figure 2:
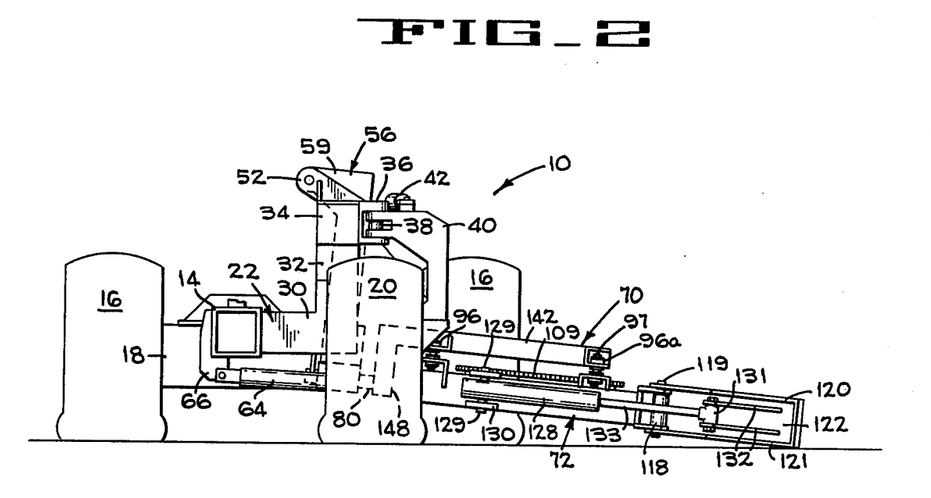
FIG. 2 is an enlarged end elevational view of the apparatus shown in FIG. 1.
Figures 3, 6:
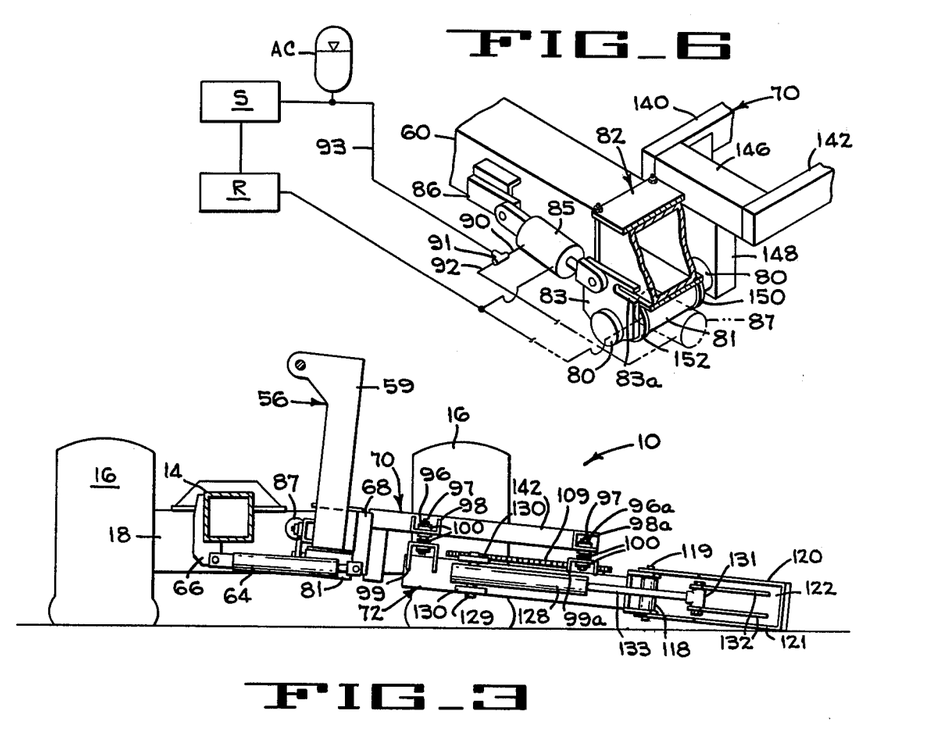
FIG. 3 is an enlarged sectional view taken on line 3—3 of FIG. 1.
FIG. 6 is a diagrammatic fragmentary isometric view of the rearward portion of the tree shaking and clamping assembly.

Referring now to FIGS. 1-3 of the drawings, it will be seen that a tree shaking apparatus 10 includes a carrier vehicle 12 adapted to be driven in a generally straight path which is parallel to a row of trees including the trees T1, T2, and T3 (FIG. 1). The carrier vehicle includes a longitudinally extending, rectangular main channel 14, a front axle housing 18 affixed to and extending transversely of the main channel, and a pair of front wheels 16 which are steerably mounted to the ends of the axle housing 18. A rear wheel 20 is steerably mounted to a support frame 22 which extends to the right side of the vehicle main channel at the rear end thereof, as will be hereinafter described. Each wheel is driven by a hydraulic motor through a gear box unit (not illustrated). The front wheels 16 are steerably mounted to the axle housing by a conventional arrangement wherein each hydraulic motor and gear box unit is supported within a ring (not illustrated) which is pivotally mounted within the respective end of the axle housing 18. Each front wheel is steered by a hydraulic cylinder (also not shown) connected between the respective ring and the housing end, and a tie rod (not shown) is connected between the rings.

An operator's compartment 24 is mounted upon the front end of the main channel 14. As seen in FIG. 1, the operator's seat 25 in the operator's compartment faces to the right side of the carrier vehicle to enable the operator to maneuver the vehicle while facing the row of trees to be harvested. The steering wheel 26 is accordingly mounted at the right side of the operator's compartment 24 and to the front of the seat 25. An engine (not illustrated) is mounted within an engine compartment 28 situated to the rear of the operator's compartment 24. The engine includes a take-off shaft which is connected to a hydraulic pump (not illustrated) which provides fluid under pressure to the hydraulic motors which are coupled to the front and rear wheels and also to the shaker assembly motor and various associated hydraulic cylinders to be mentioned hereinafter.

The rear wheel support frame 22, which is best seen in FIG. 2, includes a horizontal portion 30 extending transversely to the right side of the main channel 14 and a vertical portion 32 extending vertically from the end of the horizontal portion 30. As shown in FIGS. 1 and 2, the support frame 22 further includes a longitudinal portion 34 extending horizontally and rearwardly from the upper end of vertical portion 32. A bracket 36 is mounted to the outer side of the longitudinal portion 34, and the upper end of a generally L-shaped arm 40 is pivotally received for rotation about a vertical axis on a shaft 38 received in the bracket 36. The rear wheel 20 is rotatably mounted upon the lower end of the arm 40. A hydraulic cylinder 42 is operatively connected between the upper portion of the arm 40 and a bracket 44 (FIG. 1) projecting from the upper end of the vertical portion 32 of the support frame. The rear wheel 20 is thus steered by rotation about the axis defined by the shaft 38 by operating the cylinder 42.

As shown in FIG. 1, a short horizontal frame member 46 extends rearwardly from the axle housing 18, and a vertical frame member 50 projects upwardly from the rear end of the horizontal frame member 46. Brackets 52 and 53 are mounted in parallel aligned relationship to the upper ends of the vertical portion 32 of the rear wheel support frame 22 and to the vertical frame member 50, respectively. A shaker assembly support frame 56 is pivotally mounted to the brackets 52 and 53 for rotation about an axis A which is parallel to the longitudinal axis of the vehicle (FIG. 1). Such shaker assembly support frame 56 includes a longitudinally extending channel 60 and a pair of parallel support legs 58 and 59 which are connected to the ends of the channel 60. The legs 58 and 59 are provided with laterally extending ears (FIG. 3) at the upper ends thereof which are pivotally received on pins that are mounted in longitudinally aligned positions by the brackets 52 and 53. The rotational position of the shaker assembly support frame 56 about the axis A is controlled by a pair of hydraulic cylinders 64 (FIG. 3). The cylinders 64 are each operatively connected between a bracket 66 which extends downwardly from the main channel 14 and a bracket 68 which extends downwardly from the channel 60 of the shaker assembly support frame 56. Controls (not illustrated) for operating the cylinders 64 are, of course, located in the operator's compartment 24.

Figure 4:
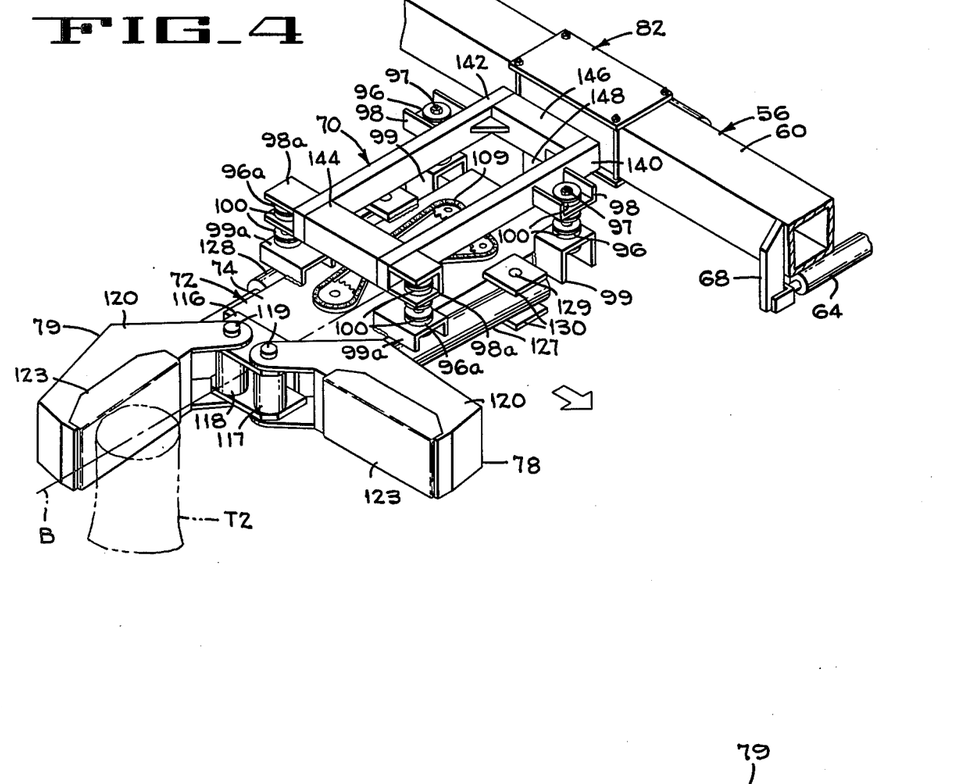
FIG. 4 is an isometric view of the shaking and clamping assembly of the apparatus.

Next referring to FIGS. 1, 3, and 4, it will be seen that a shaker assembly suspension frame 70 is pivotally mounted to the longitudinally extending channel 60 of the pivotable support frame 56 for rotation about an axis B which is perpendicular to the axis A (FIG. 1); and a shaking and clamping assembly 72, hereinafter referred to as the shaker assembly 72, is resiliently mounted to and depends from the suspension frame 70. As best seen in FIG. 4, and as will be hereinafter described in further detail, the shaker assembly 72 includes a rectangular housing 74, a front clamping arm 78 which is pivotally mounted by means of a bracket 116 to the front wall of the housing 74, and a rear clamping arm 79 which is also pivotally mounted by the bracket 116 to the housing in opposition to and behind the front clamping arm 78. It will be seen that the shaker assembly 72 is suspended from the frame 70 such that the long axis of the housing 74 is perpendicular to the channel 60, and thus, to the longitudinal axis of the carrier vehicle 12; that is, the shaker assembly is oriented transversely with respect to the longitudinal axis of the vehicle.

As illustrated in FIG. 4, the suspension frame 70 includes front and rear frame members 140 and 142, respectively, cross members 144 and 146 which extend between the ends of the members 140 and 142, respectively, and a channel member 148 (FIG. 6) which depends perpendicularly from the center of cross member 146. As best seen in FIG. 6, a support cylinder 80 is welded to the lower end of the member 148 to extend perpendicularly therefrom. The cylinder 80 is journaled within the bore of a cylindrical sleeve 81 which is transversely mounted below the channel 60 by a bracket assembly 82. A first guide collar 150 is affixed to the inner end of the cylinder 80, and a second guide collar 152 is affixed to the cylinder near the outer end thereof so as to maintain the cylinder within the sleeve 81. A bearing plate 83 is mounted adjacent the outer end of the cylinder to extend radially therefrom in a direction parallel to the channel member 148 of the suspension frame 70. A piston of a first hydraulic cylinder 85 is operatively engaged in a slot formed in the front end of the bearing plate 83 and the cylinder portion thereof is pivotally coupled to a bracket 86 which is fastened to the side wall of channel 60 at a position to the front of the sleeve 81. A second hydraulic cylinder 87 is mounted by a bracket 88 (FIG. 1) to the side wall of channel 60 behind the sleeve 81, and the piston thereof is engaged in a slot 83a (FIG. 6) formed in the rearward edge of the bearing plate 83. A hydraulic line 90 is connected between the inlet port of the front cylinder 85 and one leg of a T-connector 91, and a hydraulic line 92 is connected between the inlet port of the rear cylinder 87 and another leg of the T-connector 91. The third leg of the T-connector is connected by a line 93 to a suitable source S of hydraulic fluid under a regulated pressure, and an accumulator AC is connected to the line 93. The outlet ports of the cylinders 85 and 87 communicate with a reservoir R.

The aforedescribed pivotal mounting and hydraulic cylinder control arrangement for the suspension frame 70 enables the suspension frame and the shaker assembly 72 depending therefrom to pivot about its axis of rotation B through a total angle of approximately 30° centered upon a horizontal plane through the channel 60. The suspension frame is thus permitted to rotate when the clamping arms 78 and 79 are clamped to a tree trunk which is not normal to the plane of the channel 60, that is, when the clamped tree trunk is not perpendicular to the ground. When the clamping arms are unclamped subsequent to shaking such a tree, the suspension frame, and thus the clamping arms, will automatically achieve a level orientation parallel to the channel 60 as the hydraulic pressure in lines 90 and 92 move both pistons of cylinders 85, 87 to their normal extended positions. Such automatic leveling thus results from the counteracting and self-equalizing pressures exerted by the hydraulic cylinders 85 and 87 which are supplied with fluid under pressure from a common source.

The housing 74 of the shaker assembly 72 is resiliently mounted to the suspension frame 70 by two inner support units 96 and two outer support units 96a (FIG. 4). The support units 96, 96a are respectively comprised of upper brackets 98, 98a mounted to the frame members 140 and 142 of the suspension frame and lower brackets 99, 99a which are fixed to the housing 74. Each support unit 96, 96a further comprises a suspension bolt 97 extending between the upper and lower brackets and flexible annular pads, or grommets, 100 which are received about the bolt to clamp the bolts to the upper and lower brackets. It will be appreciated that this resilient mounting arrangement facilitates the desired application of reciprocatory shaking forces from the shaker assembly 72 to the tree trunk engaged by the clamping arms 78, 79 and isolates such forces from the body of the carrier vehicle 12.

Figure 5:
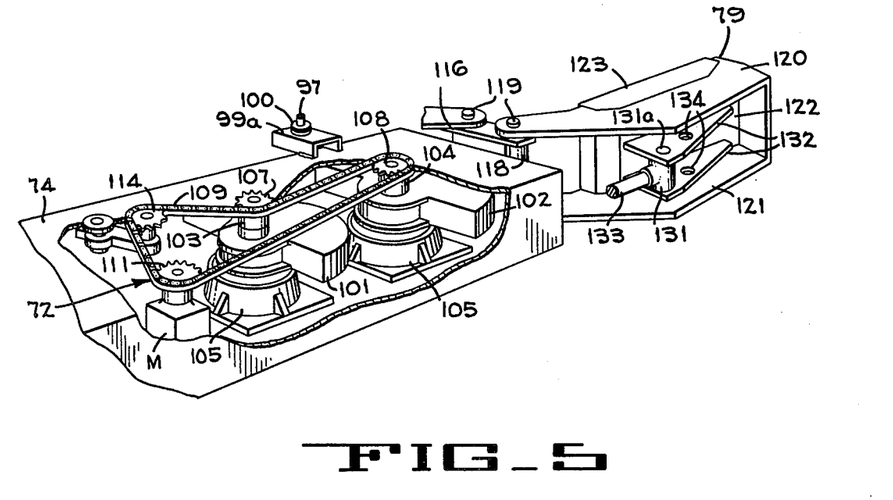
FIG. 5 is an enlarged fragmentary isometric view of the housing of the tree shaking and clamping assembly shown in FIG. 4 which is broken away to illustrate the dual-eccentric-weight shaking mechanism.

The shaker mechanism, which is illustrated in FIG. 5, is of conventional construction and is disclosed in U.S. Pat. No. 3,564,825 to Gould et al, which patent is incorporated herein by reference. Briefly stated, the eccentric-weight shaking system consists of two counter-rotatable eccentric weights 101 and 102 which are respectively fixed to parallel shafts 103 and 104. The shafts 103 and 104 are supported in bearings 105 mounted to the bottom wall of the housing 74. Sprockets 107 and 108 are fixed to the tops of the shafts 103 and 104 respectively; and a drive chain 109 is entrained on the sprockets 107, 108 and also about a drive sprocket 111 mounted on the drive shaft of a hydraulic motor M mounted within the housing 74. The drive chain is further entrained about an idler tension sprocket 114. The chain is engaged on opposing faces of the sprockets 107 and 108 to drive the associated eccentric weights 101 and 102 in counter-rotating directions to thereby produce the desired shaking forces in the housing 74. The eccentric weights are of a hollow construction and are partially filled with lead pellets. As described in the aforementioned U.S. Pat. No. 3,564,825, by filling the weights with varying amounts of lead pellets, the amount of shaking force applied by the shaker head assembly 72 can be varied to match the degree of shaking force required for particular types and sizes of trees.

An important feature of the shaking apparatus of the present invention is that the front and rear clamping arms 78 and 79 (FIG. 4) are each independently and selectively retractable in a scissor-like manner. Each clamping arm is pivotable through an arcuate path from a tree-engaging position generally perpendicular to the longitudinal axis of the carrier vehicle to a retracted position generally parallel to the longitudinal axis of the vehicle. Such movement permits the clamping arms to clear the path of the trees in the row of trees to be harvested but allows the arms to be readily moved into clamping positions when necessary. As previously stated, the front and rear clamping arms 78, 79 are pivotally mounted to the outer end of the housing 74, which is proximal the row of trees to be harvested, by a bracket 116. The bracket 116 supports in spaced relationship a pair of sleeves 117 and 118 to which the inner ends of the front and rear clamping arms are respectively journaled by pins 119. The sleeves 117 and 118 are parallel to the axes of revolution of the eccentric weights 101 and 102 of the shaker head assembly and are spaced apart in the direction of travel of the carrier vehicle. The clamping arms are of mirror-image weldment constructions, each including (FIG. 5) upper and lower walls 120 and 121, respectively, which are rigidly inner-connected by a contoured upright wall 122 to which a resilient pad 123 is mounted. It will be seen from the drawings that the interior edges of the walls 120, 121 are recessed to receive the respective resilient pad 123.

The resilient pads 123 are provided for resiliently engaging the trunk of a tree and are of a conventional construction as, for example, is disclosed in U.S. Pat. No. 3,494,654 to Gould et al, which patent is also incorporated herein by reference. As described in the U.S. Pat. No. 3,494,654 patent, overlying strips of flexible belting material may be provided for engagement between the pad and the tree trunk so that the overlying strips of material will slide with respect to the underlying pad when shear forces imparted by the pad reach a value somewhat below that which would damage the bark of the tree trunk being shaken.

It will be seen from FIGS. 4 and 5 that the upper and lower walls 120, 121 of the clamping arms 78, 79 are sufficiently spaced so that each clamping arm is retractable to a position which overlaps the adjacent corner of the rectangular shaker head assembly housing 74. In this manner, each clamping arm is retractable from an outwardly extending position wherein a tree to be shaken is engaged to a retracted position which is angularly displaced approximately 90° from such outwardly extended position. The front and rear clamping arms are separately and independently operable by means of front and rear hydraulic cylinders 127 and 128, respectively. The cylinder member of each of the hydraulic cylinders has aligned studs 129 (FIGS. 2-4) extending upwardly and downwardly from the exterior thereof near the rear end thereof, and the studs 129 are rotatably engaged in aligned apertures formed in lugs 130 attached to the housing 74. As best seen in FIG. 5, the piston member 133 of each of the hydraulic cylinders 127 and 128 has a knuckle 131 at the end thereof which is rotatably mounted on a pin 131a extending between a pair of parallel plates 132 which are welded to the outside surface of the upright wall 122 of the respective clamping arm. The clamping arm cylinders 127 and 128 have separate hydraulic lines connected thereto, and separate, conventional controls associated with the respective cylinders are situated in the operator's compartment 24.

Figure 7:
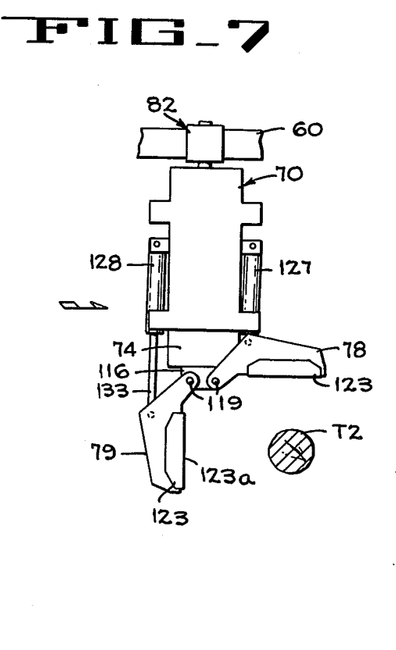
FIGS. 7-9 are operational plan views which diagrammatically illustrate the operation of the improved mobile tree shaking apparatus of the present invention.
Figure 8:
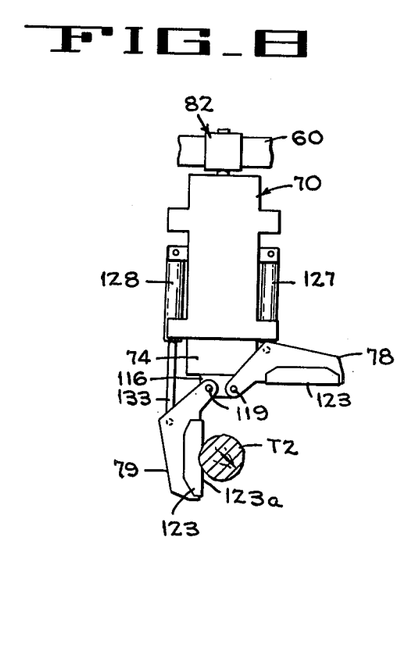
Figure 9:
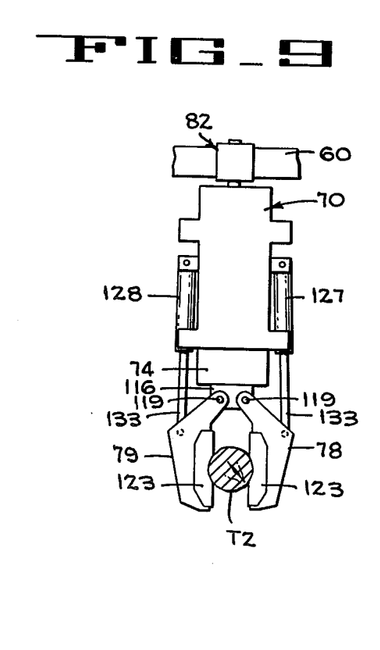

As shown in FIGS. 7-9, when the rear clamping arm 79 is in its normal outwardly extended shaking position, the face 123a of the resilient pad 123 which engages the tree will be generally parallel to the longitudinal axis of the housing 74 and thus perpendicular to the longitudinal axis of the carrier vehicle 12. In the event that the trunk of the tree to be shaken is of a larger diameter than that shown, the clamping arm 79 should be extended only so far as to incline the face 123a rearwardly to an extent such that when it abuts against the trailing side of the tree trunk, the axis of such tree will be generally aligned with the longitudinal axis B (FIG. 1) of the shaker assembly housing 74; in this manner, when the front clamping arm 78 is pivoted to abut the trunk, the clamping face of its resilient pad will be angularly displaced forwardly by the same angle that the face of the pad of the rear clamping arm is displaced rearwardly. Adjustment of the rear clamping arm to accommodate larger trees is provided by connecting the pin 131a (FIG. 5) upon which the knuckle 131 at the end of the piston 133 is journaled to another pair of aligned bores 134 in the plates 132, which pair of bores is spaced farther from the clamping arm pivot point (pin 119) than the bores to which the piston is connected as shown in FIG. 5. The front clamping arm is adjusted for clamping larger trees in a similar manner.

FIGS. 7-9 diagrammatically illustrate the operation of the tree shaking apparatus 10 and the improved tree shaking method of the present invention. FIG. 7 illustrates the arrangement assumed by the front and rear clamping arms 78, 79 when the carrier vehicle 12 is being moved toward the tree T2 in a row of trees to be shaken. It will be seen that the carrier vehicle is moved along a straight path of travel parallel to the row of trees to be harvested. As illustrated in phantom outline in FIG. 1, after having shaken the preceding tree T1 in the row, the front and rear clamping arms 78 and 79 are fully retracted from the tree into their stowed (retracted) positions, thereby enabling the vehicle to be driven along said straight path of travel parallel to the tree row with the stowed rear clamping arm being removed from the path of the tree T1. After passing by the harvested tree T1, the rear clamping arm only is extended by actuating the rear cylinder 128. The rear clamping arm and the resilient pad 123 affixed thereto comprise a visual reference upon which the operator takes sight in order to quickly and accurately maneuver the vehicle to a shaking position transversely aligned with and closely spaced from the next tree T2 in the tree row where further forward travel of the vehicle ceases. When the vehicle is stopped the resilient pad 123 will be either closely adjacent to or actually engaged against the trailing side of the tree T2. Such shaking position of the carrier vehicle is illustrated in FIG. 8.

FIG. 9 illustrates the next step in the shaking operation whereby the front clamping arm 78 is extended by independently actuating the front cylinder 127 to the extent that the resilient pad 123 of the front clamping arm is firmly engaged against the leading side of the trunk of tree T2 which brings the rear clamping arm 79 into firm engagement with the tree also. With both clamping arms extended and the resilient pads thereof firmly compressed against the sides of the tree trunk, the motor M of the shaker assembly 72 is actuated to apply shaking forces to the tree. After the fruits or nuts have been shaken loose, the motor M is deactivated and the cylinders 127 and 128 are actuated so as to withdraw both the front and the rear clamping arms 78 and 79 into their stowed, or retracted, positions such that, as previously explained, the vehicle 12 may be driven straight ahead from the tree T2 to the next tree T3 in the tree row. This sequence of operations is repeated until the last tree in the row has been harvested.

In the event that the ground adjacent the tree to be shaken slopes downwardly toward the vehicle, the cylinders 64 connected between the pivotable support frame 56 and the fixed main channel 14 of the vehicle may be actuated to pivot the support frame upwardly to thus elevate the suspended shaker assembly 72 so that the clamping arms will engage the tree trunk at the proper height above the ground. If the ground slopes downwardly toward the trees to be shaken, the cylinders 64 may be actuated in the opposite direction to lower the shaker assembly.

As previously indicated, the ground adjacent a tree to be shaken may also be sloped in a direction parallel to the direction of movement of the carrier vehicle, or alternatively, the tree may be inclined relative to a plane which is parallel to the main frame of the carrier vehicle 12. If the trunk of the tree or the ground surrounding it is so inclined, when the rear clamping arm 79 is forced against the tree trunk, the clamping arm will pivot and align itself to the skewed tree trunk. This capability is provided by the pivotal arrangement shown in FIG. 6 including the mutually opposed cylinders 85 and 87 which provide adjustable bearing engagement with the shaker head suspension frame through the support cylinder 80. The accumulator AC is connected to the cylinders 85 and 87 to act as a shock absorber. By way of example, if the trunk of the tree is inclined toward the front of vehicle 12, when the clamping arms are forced tightly against the trunk by actuating the cylinders 127 and 128 to firmly engage the clamping arms against the opposite sides of the tree, the clamping arms and shaker assembly will rotate into an orientation which is normal to the axis of the trunk. When the clamping arms are retracted after the tree has been shaken, the counteracting cylinders 85 and 87 will automatically return the suspension frame 70 to the position shown in FIG. 4 wherein the shaker assembly 72 is parallel to the plane of the longitudinally extending channel 60 of the support frame 56 and, thus, to the plane of the ground under the carrier vehicle.

Although the best mode contemplated for carrying out the present invention has been herein shown and described, it will be apparent that modification and variation may be made without departing from what is regarded to be the subject matter of the invention.

What is claimed is:

1. An apparatus for sequentially shaking the trunks of trees in a row of trees comprising:
   a carrier vehicle adapted to be driven along a generally straight path of travel which is parallel to the row of trees to be harvested; and
   a tree shaking and clamping assembly resiliently mounted to said carrier vehicle to extend transversely with respect to said straight path of travel, said assembly including
   a housing;
   a first clamping arm pivotally mounted on said housing for rotation about an axis which is proximal to said row of trees to be shaken, said arm being pivotable through an arcuate path from a stowed position extending forwardly of and generally parallel said path of travel to a transversely extended position adapted to engage the leading side of the trunk of a tree to be shaken;
   a second clamping arm pivotally mounted to said housing for rotation about an axis which is parallel to the axis of rotation of said first clamping arm, said second clamping arm being mounted to the rear of said first arm, said second arm being pivotable through an arcuate path from a stowed position extending rearwardly of and generally parallel to said path of travel to a transversely extended position adapted to engage the trailing side of the trunk of a tree to be shaken;
   first means mounted to said housing for pivoting said first clamping arm;
   second means mounted to said housing for pivoting said second clamping arm, said first and second means being selectively and independently operable; and,
   means for applying shaking forces to said arms.

2. The apparatus according to claim 1 including means mounting said tree shaking and clamping assembly to said vehicle for pivotal movement about an axis which is parallel to the longitudinal axis of the vehicle.

3. The apparatus according to claim 2 including further means mounting said tree shaking and clamping assembly to said vehicle for pivotal movement about an axis extending transversely to said longitudinal axis of the vehicle.

4. The apparatus according to claim 1 further comprising first frame means pivotally mounted to said carrier vehicle for rotation about an axis which is parallel to the longitudinal axis of the vehicle; second frame means pivotally mounted to said first frame means for rotation about an axis which is transverse to said axis of rotation of said first frame means; means for resiliently mounting said housing of the shaking and clamping assembly to said second frame means; means for selectively pivoting said first frame means to thereby adjust the height of said clamping arms; and means mounted between said first frame means and said second frame means for maintaining said second frame means in a selected position whereat the axes of rotation of said clamping arms are perpendicular to the axis of rotation of said first frame means and for permitting said second frame means to pivot when said clamping arms are forced together against a tree trunk which is skewed relative to the axis of rotation of the clamping arms.

5. An apparatus for sequentially shaking selected stems of plants which are grown in rows to displace crops from said plants, said apparatus comprising: a frame; means for moving said frame along a path of travel which is parallel to the row of plants to be harvested; and means resiliently mounted to said frame for clamping and shaking a stem of a plant in said row, said last-named means including a housing which extends transversely of said frame to a position which is proximal to said row of plants, a first clamping arm pivotally mounted to said housing proximal the leading end thereof relative to said path of travel of the frame, a second clamping arm pivotally mounted to said housing proximal the trailing end thereof, said first and second arms each having pad means for resiliently engaging a stem to be shaken when both of said arms are pivoted outwardly relative to said housing into extended positions, means for applying shaking forces to said arms, said arms being pivotally mounted to said housing to pivot in opposite directions from their respective extended positions each through generally 90° of arcuate movement to stowed positions where they are generally parallel to the path of travel of said frame and thus generally parallel to the row of plants to be harvested, and means for pivoting said first and second arms between said stowed positions and said extended positions, whereby said frame may be moved along a straight path between the plants in said row without substantial slewing of the frame to align the clamping and shaking means with a plant in said row.

6. The apparatus according to claim 5 wherein said means for pivoting said arms comprises first independently controllable pivoting means operatively connected to said first arm and second independently controllable pivoting means operatively connected to said second arm.

7. A method of sequentially shaking the trunks of trees grown in rows comprising:
   providing a mobile frame with a shaking and clamping assembly having a leading clamping arm and a trailing clamping arm which are independently movable in a scissor-like manner relative to the frame for grasping the trunk of a tree located on one side of the frame when said frame is at a shaking position adjacent said tree;
   moving the frame along a path generally parallel to the row of trees to be harvested, and prior to arriving at said shaking location at the side of the trunk of a tree to be shaken, inwardly pivoting the leading arm to an orientation which is generally parallel to said path of travel whereby said leading arm will clear the trunk to be shaken when the frame is moved along said path to said shaking location, and outwardly pivoting the trailing arm to a position whereat said trailing arm will abut or be closely spaced from the trailing side of the trunk to be shaken when the frame arrives at said shaking location;

visually referring to the extended trailing clamping arm to guide the movement of the frame toward said trunk to be shaken, and stopping said vehicle when said trailing arm abuts or is closely adjacent to the trailing side of the trunk to be shaken;

thereafter extending the leading arm into a clamping position against the leading side of said tree;

applying a shaking motion to the clamping arms to thereby shake the trunk of the tree;

thereafter retracting at least the trailing arm to a position generally parallel to the path of movement of the frame, whereby the frame may be moved directly forward with the trailing arm clearing the trunk of the shaken tree; and, repeating the foregoing steps with respect to the subsequent trees in the row of trees which is to be shaken.

* * * * *